United States Patent [19]

Clausen

[11] Patent Number: 4,749,033
[45] Date of Patent: Jun. 7, 1988

[54] MANIFOLD AND METHOD OF MANUFACTURING THE SAME

[75] Inventor: Edvin L. Clausen, Tønder, Denmark
[73] Assignee: Norsk Hydro a.s., Oslo, Norway
[21] Appl. No.: 793,285
[22] Filed: Oct. 31, 1985
[30] Foreign Application Priority Data

Nov. 2, 1984 [NO] Norway .............................. 844355

[51] Int. Cl.⁴ .............................................. F28F 9/02
[52] U.S. Cl. ............................... 165/173; 29/157.4; 165/176
[58] Field of Search .................. 165/173, 158, 176; 29/157.4

[56] References Cited

U.S. PATENT DOCUMENTS

| | | | |
|---|---|---|---|
| 1,792,928 | 2/1931 | Rergait | 29/157.4 |
| 1,964,100 | 6/1934 | Wang | 29/157.4 |
| 2,262,627 | 11/1941 | Whitesell, Jr. et al. | 29/157.4 |
| 2,550,560 | 4/1951 | Heron | 165/173 |
| 3,741,849 | 6/1973 | Hardy | 165/173 X |

FOREIGN PATENT DOCUMENTS

| | | | |
|---|---|---|---|
| 197799 | 11/1957 | Austria | 165/173 |
| 122392 | 2/1984 | European Pat. Off. | 165/173 |
| 0122392 | 2/1985 | European Pat. Off. | 165/173 |
| 1021535 | 7/1950 | France | 165/173 |
| 71148 | 3/1957 | France | 165/173 |
| 2234539 | 2/1975 | France | 165/173 |
| 2508138 | 6/1982 | France | 165/173 |
| 101502 | 5/1962 | Netherlands | 165/173 |
| 390296 | 4/1933 | United Kingdom | 165/173 |
| 807608 | 1/1959 | United Kingdom | 29/157.4 |
| 857526 | 12/1960 | United Kingdom | 165/173 |
| 2072291 | 9/1981 | United Kingdom | 165/173 |

*Primary Examiner*—Albert W. Davis, Jr.
*Assistant Examiner*—Peggy Neils
*Attorney, Agent, or Firm*—Wenderoth, Lind & Ponack

[57] ABSTRACT

A manifold, especially a supply or receiving tank in a heat exchanger, is provided as an extruded/drawn tube with an outwardly and longitudinally extending protrusion part. Fastening flanges with a size larger than the width of the protrusion part are an integral portion of the protrusion part. The shaped tube with protrusion part is extruded or drawn, and then the protrusion part is perforated to form a plurality of apertures which are transformed in one or more steps by cold deformation into the fastening flanges of desired diameter, shape and length.

4 Claims, 5 Drawing Sheets

MANIFOLD AND METHOD OF MANUFACTURING THE SAME

BACKGROUND OF THE INVENTION

The present invention relates to a manifold, and more particularly a supply or receiving tank in a heat exchanger, including a hollow body provided with a plurality of wall apertures for the insertion of heat exchanger tubes.

Heat exchangers of the above mentioned type, employed for example as condensers or radiators in a vehicle, are in principle manufactured by two methods, i.e. soldering or mechanical expansion of the tubes after their insertion into the manifold. Both methods are at the present time characterized by several problems related to the manufacture of a reliable, leakage-proof connection having satisfactory mechanical strength. Especially the so-called solderfree radiators normally have to be provided with packing rings or possibly glue in the connections as a supplement to expansion of the tubes in order to assure an acceptable, leakage-proof contact.

DE 2448332 describes a heat exchanger for vehicles based upon a mere expansion connection between tubes and manifold without use of supplementary rubber packings. The construction is characterized by a precisely specified interaction between a number of parameters such as wall thickness, tube diameter, material strength, length of support and others expressed in empirical formulas. This construction requires high tolerances from the components, and furthermore it has obvious limitations with regard to free choice of materials, wall thickness, tube diameter, etc.

A further disadvantage of such known construction is represented by the process employed for making fastening apertures in the tube wall. The wall is "knocked down" and pressed and drawn further inwards to form a collar or flange which ensures the necessary support or backing area for fastening of the heat exchanger tubes. The height of the collar is related to the wall thickness of the manifold, which gives poor possibilities of achieving an adequate collar height on thin-walled manifolds due to the limited material mass which can be transferred in the deformation zone.

Limited material flow is also the disadvantage of the so-called T-drill or Flow-drill processes, where by means of special tools the manifold tube is perforated under formation of a low collar. Depending on the type of tool applied, this low collar is formed on the underside or both on the underside and partly also on the outside of the manifold. In those cases where the collar protrudes inwards into the manifold, the available, free cross-section of the manifold is reduced and an increased pressure drop in the heat exchanger arises due to turbulent currents in the manifold.

Additionally to the above mentioned disadvantages, also several other problems arise by soldering of the heat exchanger tubes to such manifolds. Because of the short collar a penetration of soldering material and flux along the tubes into the manifold occurs quite frequently, which further contributes to the reduction of the available, free cross-section. Flux entrapped in this way is difficult to remove and has a corrosion promoting effect on the components. Furthermore, it is difficult to achieve a tight and stable soldering connection because of the short soldering length available. In the case of inwardly protruding soldering collars it is difficult to control the amount of heat, since heating takes place mainly by means of heat conduction through the tubes, since the soldering zone is concealed in the manifold. Overheating of the tubes and mechanical weakening of the connection as a result therefore represent an imminent danger of a large reject rate by manufacture of heat exchangers according to this principle.

SUMMARY OF THE INVENTION

The object of the present invention is therefore to provide a manifold without the above mentioned disadvantages and limitations, while offering the possibility of employing thin-walled tubes in the heat exchanger, and at the same time to ensure a superior leakage-proof and rigid connection to the tubes.

Another object of the invention is to provide such a manifold with optimized dimensions and which may be directly heated at joining zones during subsequent soldering of the heat exchanger tubes to the manifold.

A further object of the invention is to provide a manifold without reduction of its inner cross-section.

BRIEF DESCRIPTION OF THE DRAWINGS

Referring to the accompanying drawings, the invention will be described below in more detail in connection with examples of embodiments thereof.

DETAILED DESCRIPTION OF THE INVENTION

Figure 1:
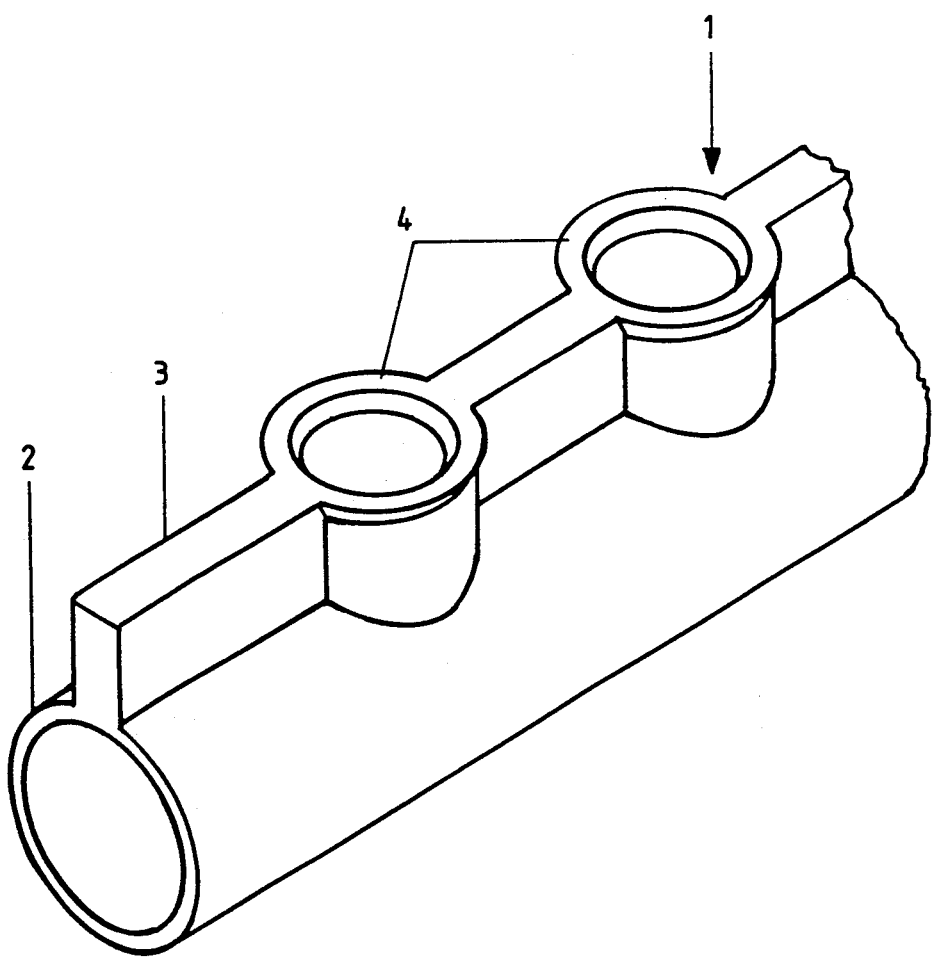
FIG. 1 is a perspective view schematically showing a section of a manifold according to the invention.

FIG. 1 shows schematically a manifold (1), which according to the invention comprises an extruded, or possibly drawn, hollow body shown as a shaped tube (2) provided with an integral, outwardly and longitudinally extending protrusion part (3). Two connection collars or flanges (4) for fastening of heat exchanger tubes to the manifold are shown bridged together by means of the protrusion part.

The design of the manifold (1) with connection flanges (4) will now be described in more detail with reference to FIGS. 2, 3 and 4.

Figure 2:
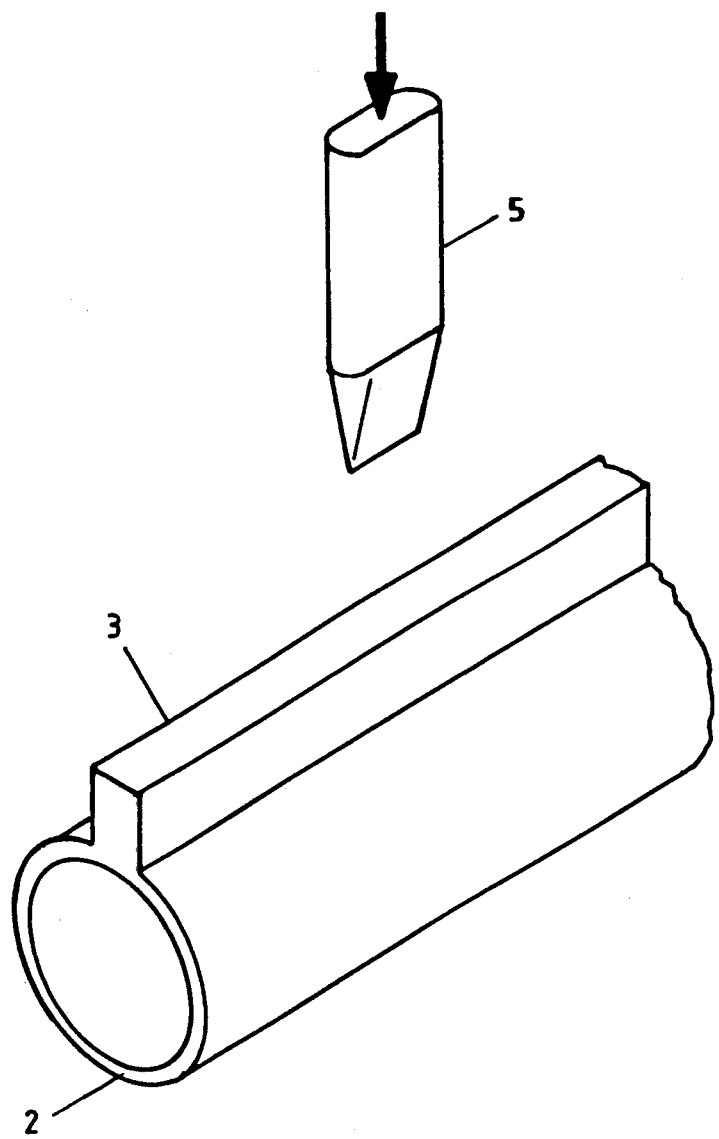
FIGS. 2–4 are similar views schematically illustrating the individual steps in a process of manufacturing such manifold.
Figure 3:
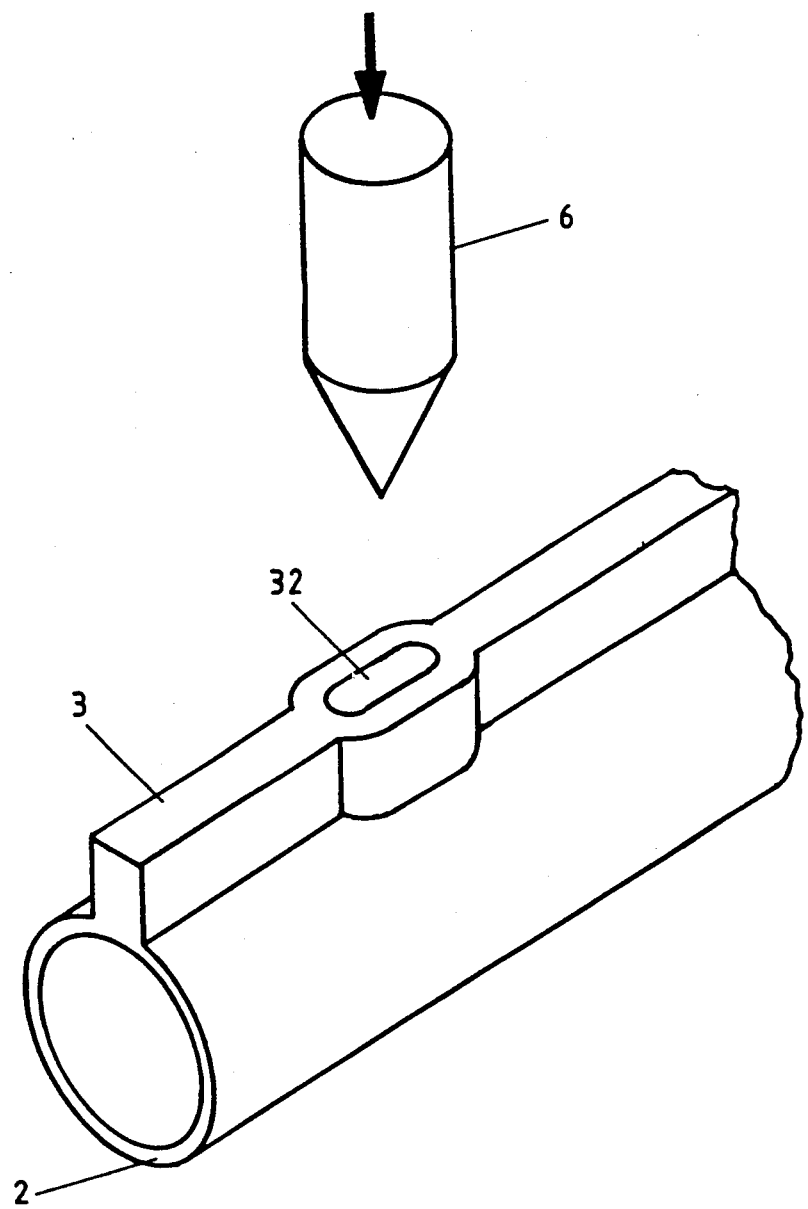

FIG. 2 shows schematically the first step of a process to form the flanges in the outwardly extending protrusion part (3) on an extruded/drawn metallic shaped tube (2) which by means of a cutting, punching or pressure tool is subjected to a perforating operation. The protrusion part (3) is split or slotted by tool 5 at several predetermined locations with transverse apertures (32) as shown in FIG. 3. These narrow apertures, which lead into the cavity or interior of the tube, constitute a basis for the next punching/pressure operation by means of a new tool (6) to reshape the apertures (32) into connection flanges 4 of a desired diameter.

As will appear from the drawings, it is the material from the protrusion part itself and not from the shaped tube walls which is employed in forming of the flanges. This provides an opportunity for optimal dimensions of the shaped tube and material saving since the diameter of the flanges can be up to five times the width of the protrusion part, depending on the wall thickness and shape of the final collars of the flanges.

Figure 4:
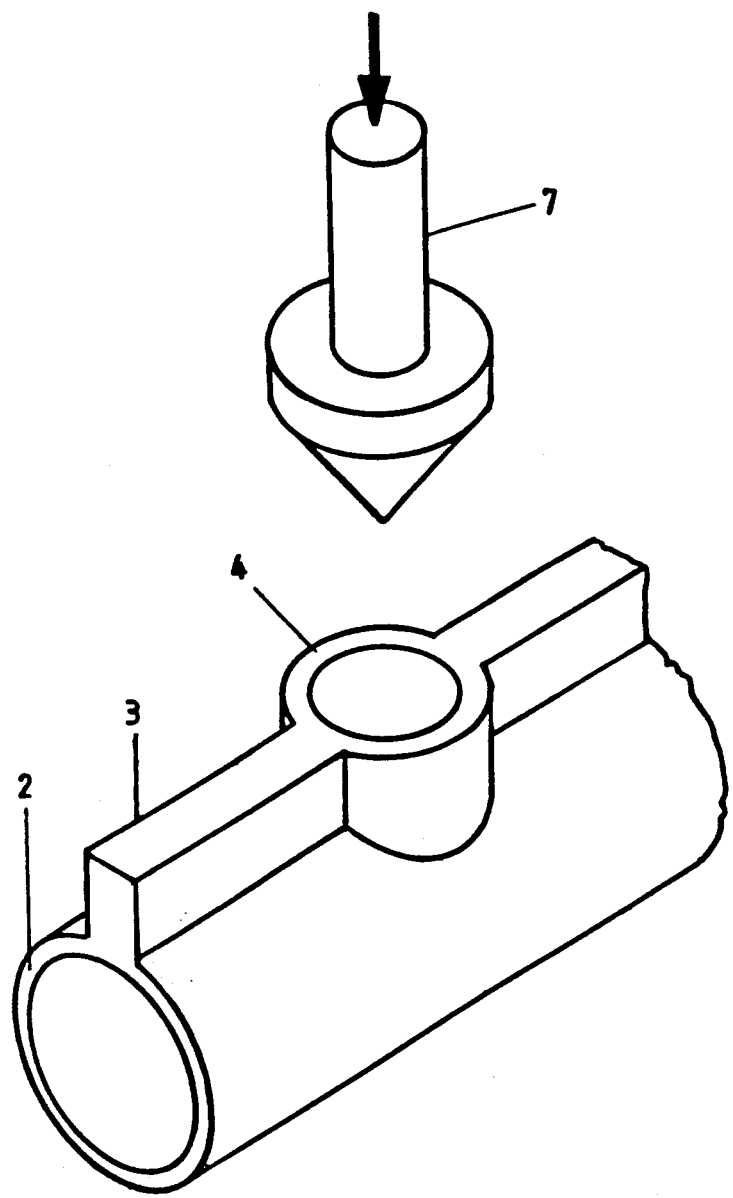

FIG. 4 shows schematically a final pressure operation where by means of a new tool (7) the flange (4) achieves the final shape and diameter, e.g. conically shaped solder collar on the top of the flange. The number of pressure/punching operations is determined by the final thickness of the flange walls and its shape with possible variations from the cylindrical/conical walls and a possible combination of such wall shapes. All steps in this cold deformation process are conducted with an outward support of the shaped tube which ensures a fixed outer shape (not shown in the figures). The applied tools can be designated so that the forming of all flanges on the manifold can be accomplished by one operation per process step.

Figure 5:
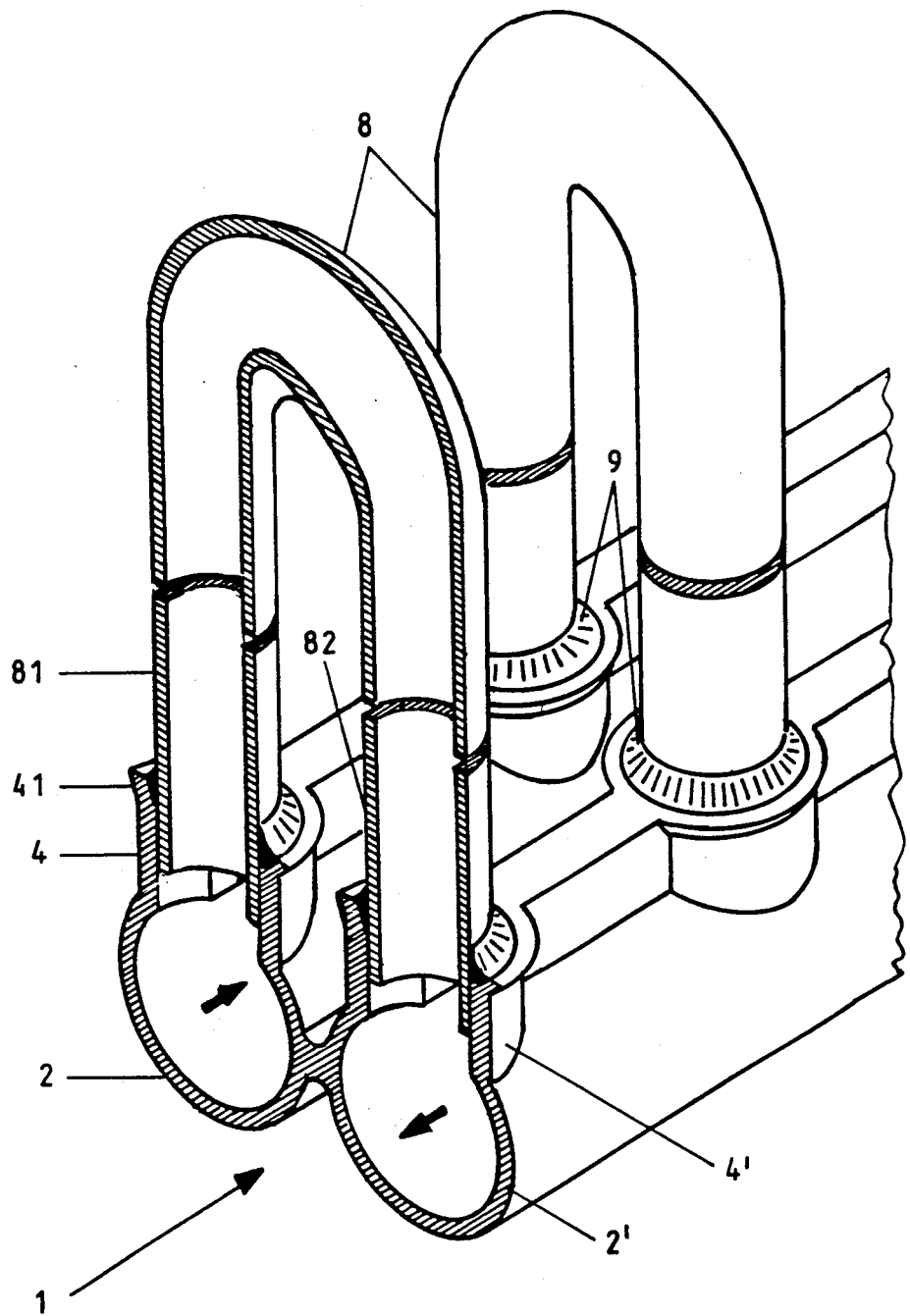
FIG. 5 is a cross-section of a heat exchanger incorporating a variant of the manifold design and with soldered heat exchanger tubes.

FIG. 5 shows in vertical cross-section a possible embodiment of a variant of the manifold according to the invention. The manifold is manufactured as two co-extruded, integral shaped tubes (2,2') constituting respectively feed and outlet tubes (pipes) for circulation of cooling medium in a heat exchanger, e.g. in a condenser. The two tubes (2,2') are connected to each other through their respective fastening flanges (4,4') by means of so-called hair pin tubing (8). Two leg portions (81,82) of the hair pin tubing (8) are, after insertion into the flanges (4,4') which give the necessary support and fix the hair pin tubing (8) into the manifold, firmly connected to the flanges by soldering shown as soldering rings (9) in solder collars (41) having conically shaped walls on the top of the flanges. The leg portions (81,82) are inserted into the manifold flanges only to such a depth that they do not represent any reduction of the available cross-section of the tubes (2,2').

As will appear from the above description and the accompanying drawings, a manifold according to the present invention ensures a rigid heat exchanger construction even when extremely thin-walled tubes are employed. This is a result of the two new special features characteristic of the manifold: flexibility with regard to choice of an adequate height of the connection flanges (resting surface for heat exchanger tubes) and a bridging between the individual flanges by the integrated, through-running protrusion part on the shaped tube which acts as a stiffener for the adjacent flanges. This feature in combination with the above mentioned maintenance of the free cross-section in the manifold results in optimal dimensions on sturdy, compact heat exchangers and, at the same time, it offers a possibility of inserting partition walls into the manifold in order to influence/regulate the current pattern in the heat exchanger. A further feature of the method of manufacturing the manifold according to the invention is the gradual exposure to material deformation as a cold deformation which results in increased material strength of the manifold. By a possible overheating during the soldering operation, only a sort of (soft) annealing back to the starting point will take place before the deformation, and not material weakening as is experienced in prior art.

What is claimed is:

1. A manifold, particularly for use in a heat exchanger, said manifold comprising:

an elongated metallic hollow member having an interior;

a protrusion integral with and extending outwardly from the outer surface of said hollow member and extending longitudinally thereof;

a plurality of apertures extending through said protrusion and said hollow member into said interior of said hollow member, said apertures being spaced longitudinally of said protrusion and said hollow member;

the material of said protrusion around each said aperture being widened in directions outwardly of said aperture and forming an annular fastening flange surrounding said aperture and integral with said protrusion, said protrusion extending between and stiffening adjacent said flanges, each said flange having an outer diameter greater than the thickness of said protrusion in a direction orthogonal to the longitudinal dimension of said hollow member; and said hollow member, said protrusion and said flanges comprising a unitary, integral metallic member free of welds and joints.

2. A manifold as claimed in claim 1, wherein said outer diameter of said flanges is from 1.5 to 5.0 times said thickness of said protrusion.

3. A manifold as claimed in claim 1, wherein each said flange has at an outer end thereof a collar defined by at least an inner conical surface.

4. A manifold as claimed in claim 1, wherein the diameter of said apertures is greater than said thickness of said protrusion.

* * * * *